(12) United States Patent  
Dalluge et al.

(10) Patent No.: US 7,703,745 B2
(45) Date of Patent: Apr. 27, 2010

(54) SEAL RETAINER/LONGITUDINAL CENTERING CLIPS WITH MULTIPLE FLANGE CAPABILITY

(75) Inventors: Paul R. Dalluge, Marshalltown, IA (US); Paul A. Day, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 836 days.

(21) Appl. No.: 11/380,108

(22) Filed: Apr. 25, 2006

(65) Prior Publication Data

US 2007/0246676 A1 Oct. 25, 2007

(51) Int. Cl.
*F16L 23/00* (2006.01)

(52) U.S. Cl. .................. 251/148; 251/305; 285/360; 285/363; 285/412

(58) Field of Classification Search ............. 251/305, 251/148; 285/363, 368, 405, 412, 360
See application file for complete search history.

(56) References Cited

U.S. PATENT DOCUMENTS

| 3,072,139 | A | * | 1/1963 | Mosites | 251/306 |
| 3,643,983 | A | * | 2/1972 | Ludeman | 285/363 |
| 3,781,043 | A | * | 12/1973 | Hagmann | 285/363 |
| 4,073,402 | A | | 2/1978 | Wood | |
| 4,079,746 | A | * | 3/1978 | Killian | 285/363 |
| 4,101,112 | A | * | 7/1978 | Conners et al. | 251/148 |
| 4,399,833 | A | * | 8/1983 | Holtgraver | 251/305 |
| 4,751,938 | A | | 6/1988 | Kerns et al. | |
| 5,029,811 | A | * | 7/1991 | Yamamoto et al. | 251/306 |
| 5,207,411 | A | * | 5/1993 | Sisk | 251/306 |
| 6,202,981 | B1 | * | 3/2001 | Davis et al. | 251/148 |
| 2003/0213522 | A1 | * | 11/2003 | O'Shea | 137/512.1 |
| 2006/0049635 | A1 | | 3/2006 | Brazier et al. | |

FOREIGN PATENT DOCUMENTS

DE 9405913 U 11/1994

OTHER PUBLICATIONS

International Search Report for PCT/US2007/007654, dated Sep. 20, 2007.

* cited by examiner

*Primary Examiner*—John Bastianelli
(74) *Attorney, Agent, or Firm*—Marshall, Gerstein & Borun LLP

(57) ABSTRACT

A wafer-style valve assembly adapted to be coupled between opposing pipeline components having a common centerline secured together by a plurality of longitudinal fasteners includes a substantially cylindrical valve body, a seat retaining plate, and at least one clip. The valve body has a peripheral edge portion and an axial end surface. The seat retaining plate is disposed on the axial end surface. The at least one clip is also disposed on the axial end surface and extends radially outward of the peripheral edge portion. The clip has a radially inward portion and a radially outward portion. The radially inward portion secures the seat retaining plate to the to valve body. The radially outward portion has an edge defining a first recess and a second recess. The first and second recesses are each adapted to accommodate a longitudinal fastener to locate the valve assembly relative to the centerline of the pipeline.

9 Claims, 5 Drawing Sheets

US 7,703,745 B2

SEAL RETAINER/LONGITUDINAL CENTERING CLIPS WITH MULTIPLE FLANGE CAPABILITY

FIELD OF THE DISCLOSURE

The present disclosure relates to wafer-type valves and, more particularly, to components for axially centering wafer-type valves between opposing flanges of pipeline components.

BACKGROUND OF THE DISCLOSURE

Wafer-type valves are adapted to be clamped between opposing flanges of pipeline components. Typical wafer-type valves include butterfly valves, check valves, segmented ball valves and eccentric plug valves. A common aspect of each of these types of valves is that they are flangeless. Therefore, the pipeline components include flanges for receiving longitudinal bolts that compressedly couple the wafer-type valves therebetween. One wafer-type butterfly valve includes a generally cylindrical valve body, a valve element, a valve seat, and a retainer plate. The valve body defines an axial bore that serves as a fluid flow path. The valve body typically has a relatively small axial dimension and a radial dimension adapted to accommodate the desired pipeline application. The valve element includes a disk-shaped element pivotally supported within the axial bore of the valve body between a closed position and one or more open positions. The valve seat includes a generally cylindrical member disposed adjacent to an internal radial surface of the axial bore of the valve body. The valve seat provides a surface against which the valve element seals when in the closed position. The retainer plate includes a generally flat plate fixed to an axial end surface of the valve body to retain the valve seat within the axial bore. For optimal performance and to avoid interference between the pipeline components and the valve element, such a wafer-type valve additionally includes a centering component for centering the valve in the pipeline.

A typical centering component cooperates with the longitudinal bolts extending between the pipeline flanges to axially center the valve assembly relative to the pipeline. One known centering component includes a plurality of holes formed directly through a portion of the valve body. The plurality of holes define a fixed pattern adapted to accommodate longitudinal bolts having the same fixed pattern, thereby centering the valve body. Another known centering component includes a plurality of lugs or a circumferential flange disposed on the valve body. The lugs or flange may be formed by casting or welding or otherwise fixed to the valve body. The lugs or the flange define a plurality of holes having a fixed pattern adapted to accommodate longitudinal bolts having the same pattern to thereby axially center the valve body relative to the pipeline. A still further known centering component includes one or more clips removably fixed to the valve body. The clips each define a plurality of holes having a fixed pattern for receiving longitudinal bolts having the same fixed pattern and thereby axially centering the valve body relative to the pipeline. The clips may be replaced by a different set of clips defining a plurality of holes having a different pattern for accommodating a different pattern of longitudinal bolts.

A shortcoming of each of these known centering components includes the fact that each are adapted to accommodate only a single longitudinal bolt pattern. Bolt patterns, however, are subject to different standards or ratings for different applications and, therefore, tend to vary. For example, for any given application, the American National Standards Institute (ANSI) requires a specific flange diameter, a number of bolts, a bolt size, and a pitch circle diameter. It can therefore be appreciated that for each different application, a different bolt pattern may be required. While the clip form of the known centering components described above may be replaced by a different clip to accommodate a different bolt pattern, such replacement is time-consuming. Additionally, replacement clips adapted for use with each of the different bolt patterns must be maintained.

Another shortcoming of these known centering components is that the longitudinal bolts must be guided through the holes during installation of the valves. This requires a technician to carefully align the various components and manually guide the bolts, which can be tedious and time-consuming.

A still further shortcoming of the known centering components arises during installation of the valves within the pipelines and specifically, during the transportation and positioning of the valves. For example, technicians often require the use of a lift such as a fork lift or some other device to transport the valve assemblies. To achieve this, technicians have often hooked a cable, a strap, or some other device through one or more of the holes in the centering component. During the lifting and transporting of the valve assembly, this connection can improperly stress either or both of the centering component and the threaded fastener.

SUMMARY OF THE DISCLOSURE

One aspect of the present disclosure includes a centering clip for locating or centering a wafer-type valve relative to a centerline of a pipeline. The centering clip cooperates with a plurality of longitudinal fasteners, which extend between flanges on opposing components of the pipeline. The centering clip includes a plate contoured to engage the plurality of longitudinal fasteners.

According to another aspect, the centering clip defines a first surface and a second surface. The second surface is a substantial mirror image of the first surface. Each of the first and second surfaces are adapted to engage one of the plurality of longitudinal fasteners.

According to another aspect, the first and second surfaces include curved surfaces. The curved surfaces are adapted to at least partially surround the longitudinal fasteners.

According to still another aspect, the centering clip additionally includes opposing end portions respectively defining the first and second surfaces. The centering clip is configurable in a first position relative to the valve body to accommodate a first pattern of longitudinal fasteners and a second position relative to the valve body to accommodate a second pattern of longitudinal fasteners.

According to yet another aspect, the centering clip additionally includes a radially outward edge defining the first and second surfaces and, additionally, third and fourth surfaces. The first and second surfaces are adapted to accommodate a first pattern of longitudinal fasteners. The third and fourth surfaces are adapted to accommodate a second pattern of longitudinal fasteners that is different from the first pattern.

DETAILED DESCRIPTION OF THE DISCLOSURE

Figure 1:
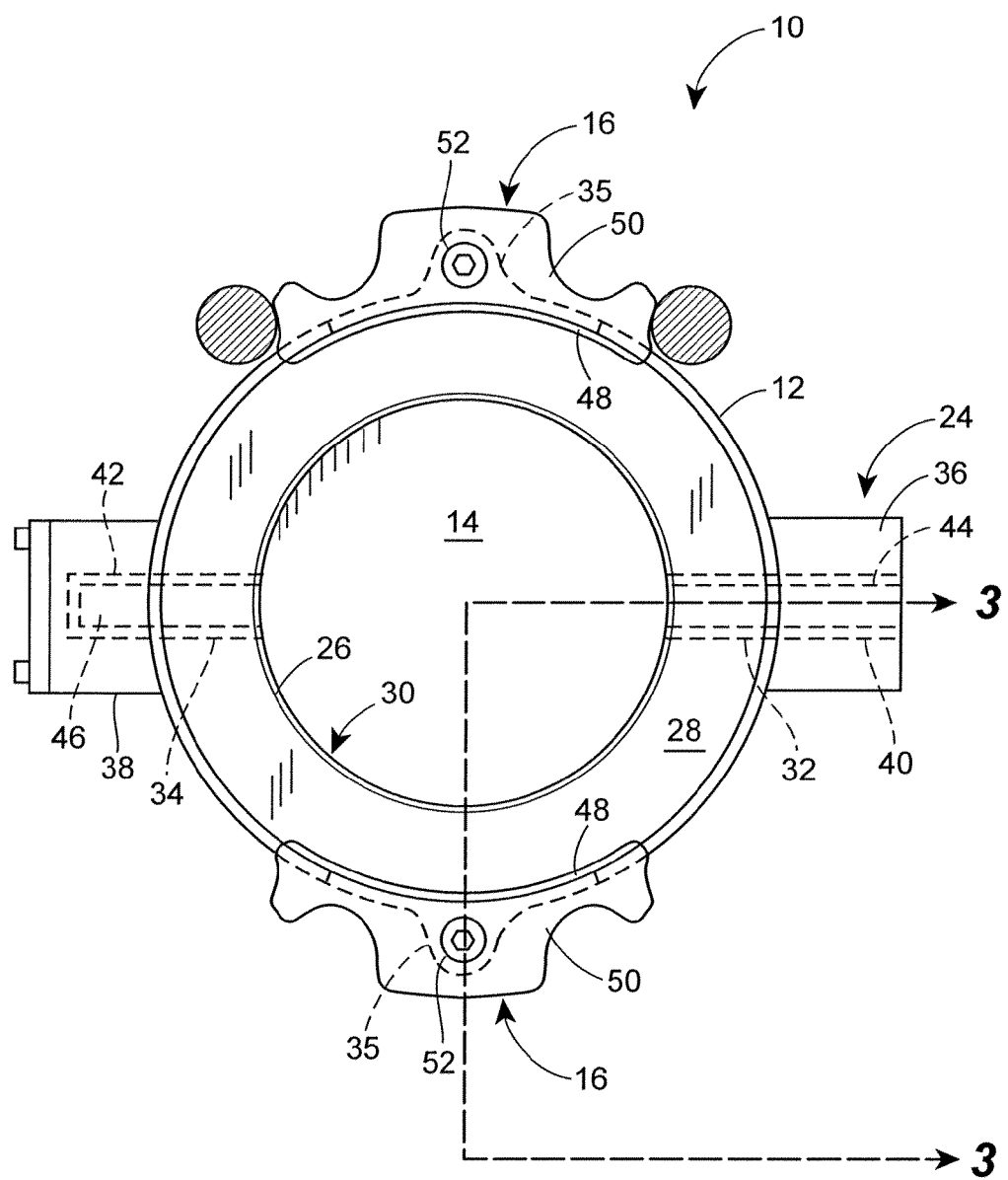
FIG. 1 is an axial end view of a valve assembly including a pair of centering components according to the principles of the present disclosure.
Figure 2:
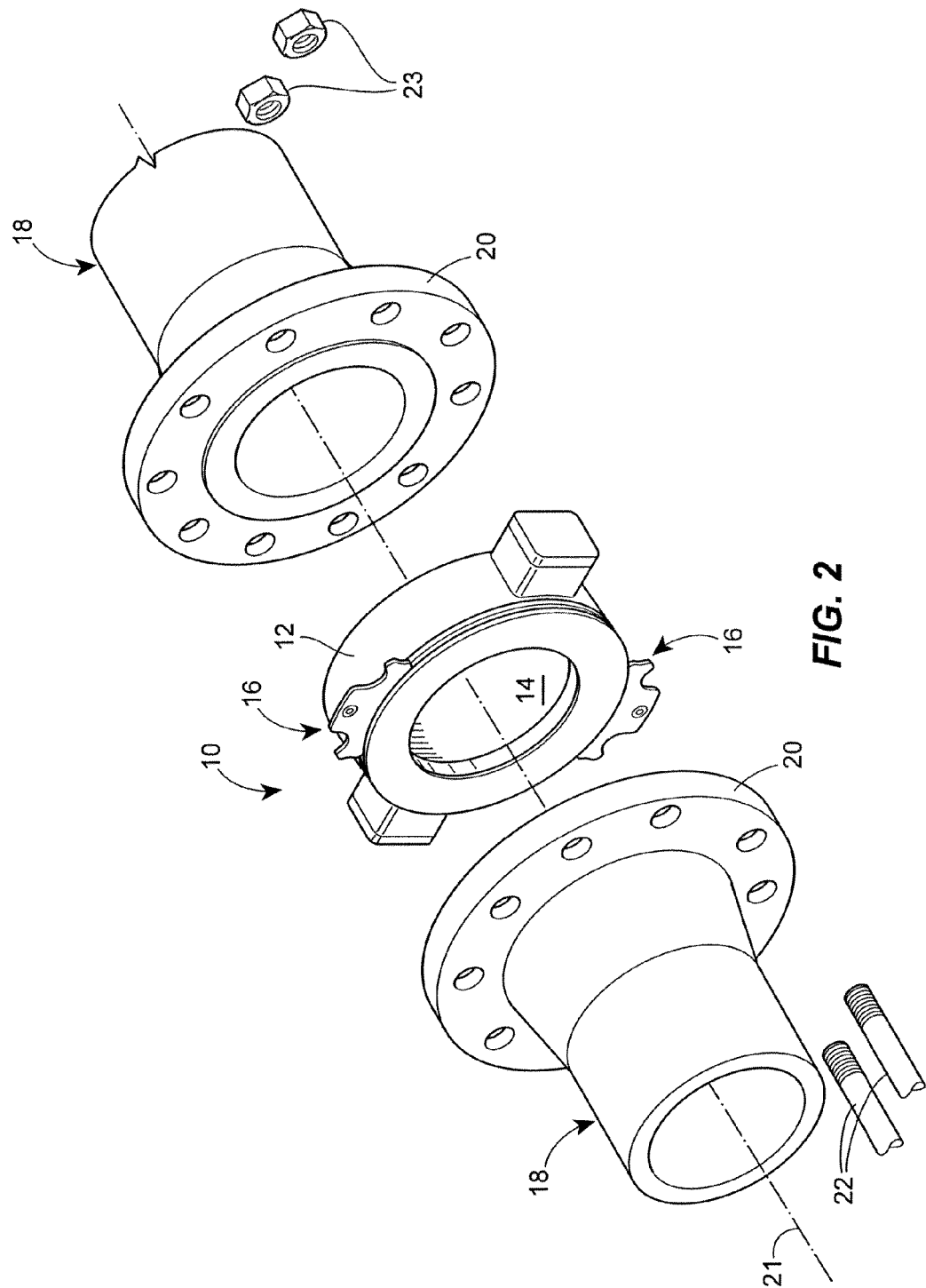
FIG. 2 is an exploded perspective view of the valve assembly of FIG. 1 showing the valve assembly disposed from between a pair of pipeline components.
Figure 3:
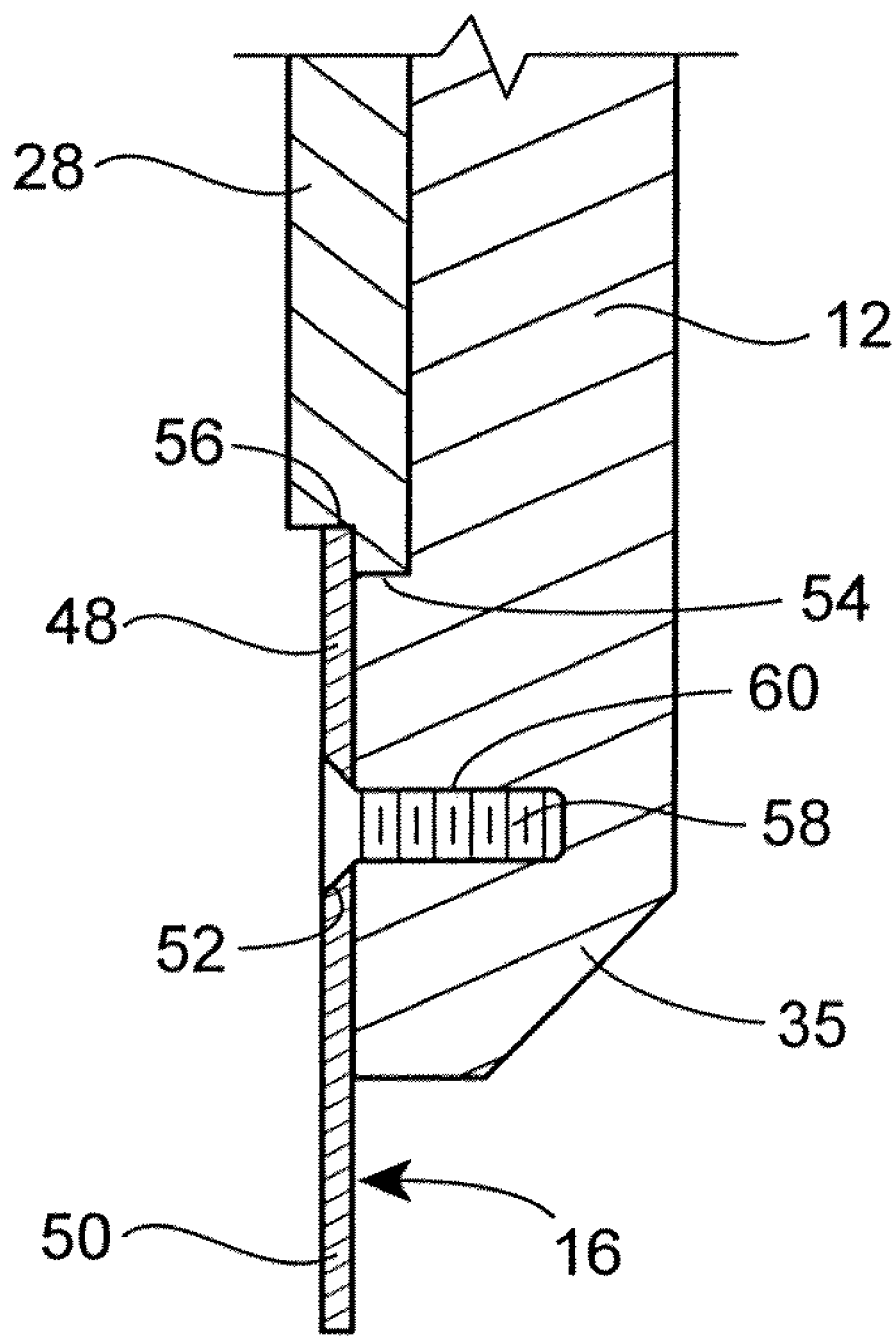
FIG. 3 is a cross-sectional view of a portion of the valve assembly according to the principles of the present disclosure taken through line 3-3 of FIG. 1.

With reference to FIGS. 1-3, a valve assembly 10 constructed according to the principles of the present disclosure includes a wafer-type valve and, more specifically, a wafer-type butterfly valve. It should be appreciated however that the subject of the present application is not limited to a butterfly valve, but rather, is intended to apply to any type of flangeless wafer-type valve. Nevertheless, the valve assembly 10 generally includes a cylindrical valve body 12 containing a disk-like valve element 14 and including a pair of centering components 16.

As depicted in FIG. 2, the valve assembly 10 is adapted to be coupled between two components 18 of a pipeline having a common centerline 21. The pipeline components 18 provide a flow-path for a fluid. The pipeline components 18 each include flanges 20 adapted to be fixed together with a plurality of longitudinal bolts 22, of which only two are depicted for the sake of simplicity. During installation, and as will be discussed in much greater detail below, the disclosed centering components 16 are irregular shaped or contoured such that they radially receive and accommodate the bolts 22 to axially align the valve assembly 10 relative to the pipeline components 18. In accordance with the disclosed forms, the centering components 16 help to ensure proper operation of the valve assembly 10 including pivotally opening and closing of the valve element 14 to control the flow of the fluid through the pipeline. Additionally, nuts 23 are threaded onto ends of the bolts 22 to pull the flanges 20 together, thereby creating a compressive force that sandwiches the valve assembly 10. This compressive force maintains the axial disposition of the valve assembly 10 relative to the pipeline components 18.

With continued reference to FIGS. 1-3, the valve assembly 10 will now be described in more detail. As mentioned above, the valve assembly 10 generally includes the valve body 12, the valve element 14, and the centering components 16. Additionally, the valve assembly 10 includes an actuator coupling 24, a valve seat 26, and a seat retainer plate 28.

The valve body 12 includes a substantially cylindrical member having a relatively small axial dimension, as depicted in FIG. 2. FIG. 1 illustrates that the valve body 12 defines an axial opening 30, a pair of radial through-bores 32, 34 and a pair of lugs 35. The actuator coupling 24 includes a coupling bracket 36 and a terminal bracket 38 attached to opposing outer radial sidewalls of the valve body 12. The coupling bracket 36 is adapted to be operably coupled to an actuator (not shown) for driving the valve element 14 and opening and closing the flow-path through the pipeline components 18. The coupling bracket 36 defines a through-bore 40 generally axially aligned with the through-bore 32 in the valve body 12. The terminal bracket 36 defines a bore 42 generally axially aligned with the through-bore 34 in the valve body 12. The combination of the through bores 32, 34, 40 and the bore 42 pivotally support and locate the valve element 14 relative to the valve body 12.

The valve element 14 includes a generally thin disk-shaped member disposed in and axially aligned with the axial opening 30 of the valve body 12. The valve element 14 includes a driven trunnion 44 and a support trunnion 46. The driven trunnion 44 is disposed within the radial through-bore 32 in the valve body 12 and the through-bore 40 in the coupling bracket 36 of the actuator coupling 24. The support trunnion 46 is disposed within the radial through-bore 34 in the valve body 12 and the bore 42 in the terminal bracket 38 of the actuator coupling 24. The driven trunnion 44 is adapted to be rotatably driven by the actuator (not shown) to provide pivotal displacement of the valve element 14 relative to the valve body 12. More specifically, the valve element 14 is pivotable between a seated or closed position, as shown in FIG. 1, and one or more open positions. It should be appreciated that while FIG. 1 schematically illustrates the trunnions 44, 46 generally smaller in diameter than the bores 32, 34, 40, 42 in which the trunnions 44, 46 reside, in practice the diameters of the bores 32, 34, 40, 42 and trunnions 44, 46 are manufactured to closer tolerances than depicted in order to minimize any vibration or misalignment of the valve element 14 relative to the valve body 12.

The valve seat 26 includes a generally cylindrical member disposed concentrically about the axial opening 30 in the valve body 12. The valve seat 26 provides a seal with the valve element 14 when the valve element 14 is in the closed position, as shown in FIG. 1. The seat retainer plate 28 includes a ring-shaped plate disposed on an axial end surface of the valve body 12. The seat retainer plate 28 secures the valve seat 26 to the valve body 12. Each of the centering components 16 include substantially flat plate-like members fixed to the axial end surface of the valve body 12 adjacent a peripheral portion of the seat retainer plate 28. Each of the centering components 16 includes a radially inward portion 48, a radially outward portion 50, and an aperture 52. The radially inward portion 48 is disposed radially inward of the radially outward portion 50 relative to the centerline 21 of the pipeline components 18 depicted in FIG. 2.

Referring now to FIG. 3, the valve body 12 includes a recessed shoulder portion 54 that receives the seat retainer plate 28. In one form, the shoulder portion 54 is formed on the axial end surface of the valve body 12 and extends along an entire inner peripheral portion thereof adjacent the axial opening 30. In another form, the shoulder portion 54 is not a recess formed in the axial end surface of the valve body 12, but rather, formed by the lugs 35 having axial end surfaces axially offset from the axial end surface of the valve body 12. The seat retainer plate 28 also includes a recessed shoulder portion 56. The shoulder portion 56 of the seat retainer plate 28 receives the radially inward portion 48 of the centering component 16 such that the centering component 16 secures the seat retainer plate 28 to the axial end surface of the valve body 12. In one form, the shoulder portion 56 extends along the entire outer peripheral portion of the seat retainer plate 28. So configured, the seat retainer plate 28 may be secured to the valve body 12 in any rotational orientation. In another form, however, the seat retainer plate 28 includes two recessed shoulder portions 56 formed in directly opposing radial portions of the seat retainer plate 28. So configured, each shoulder portion 56 includes a recess designed and contoured to specifically receive the radially inward portion 48 of one centering component 16, as depicted in FIG. 1. In this form, the seat retainer plate 28 must be secured to the valve body 12 in a specific rotational orientation. Finally, the aperture 52 in the centering component 16 receives a threaded fastener 58 that is tightened into a threaded bore 60 in the lug 35 of the valve body 12. The threaded fastener 58 secures the centering component 16 to the valve body 12, thereby securing the seat retainer plate 28 to the valve body 12.

It should be appreciated that while the centering component 16 has just been described as securing the seat retainer plate 28 to the valve body 12, an alternate form of the valve assembly 10 may include the seat retainer plate 28 being secured to the valve body 12 with a separate fastener, a weld joint, or any other device capable of serving the intended purpose. Additionally, while the centering component 16 has been described as being fastened to the valve body 12 with a fastener, an alternate form of the valve assembly 10 may include the centering component 16 being secured to the valve body 12 with a weld joint, adhesive, or any other device capable of serving the intended purpose. In yet another form, the centering component 16 may be formed integrally with the valve body 12 in a casting operation, a forging operation, or some other manufacturing process tailored to achieve the desired results. It should be appreciated that forming the centering component 16 integrally with the valve body 12 may include forming a one-piece or monolithic structure by one or more complementary manufacturing processes.

Figure 4:
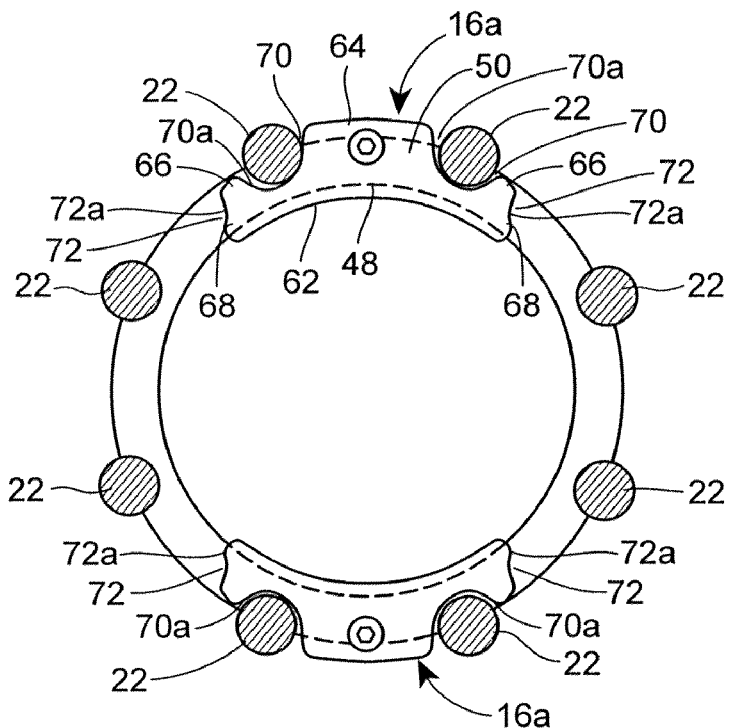
FIG. 4 is a schematic representation of an axial end view of a valve assembly including a first form of the centering component according to the principles of the present disclosure fitted to a first pattern of longitudinal bolts.
Figure 5:
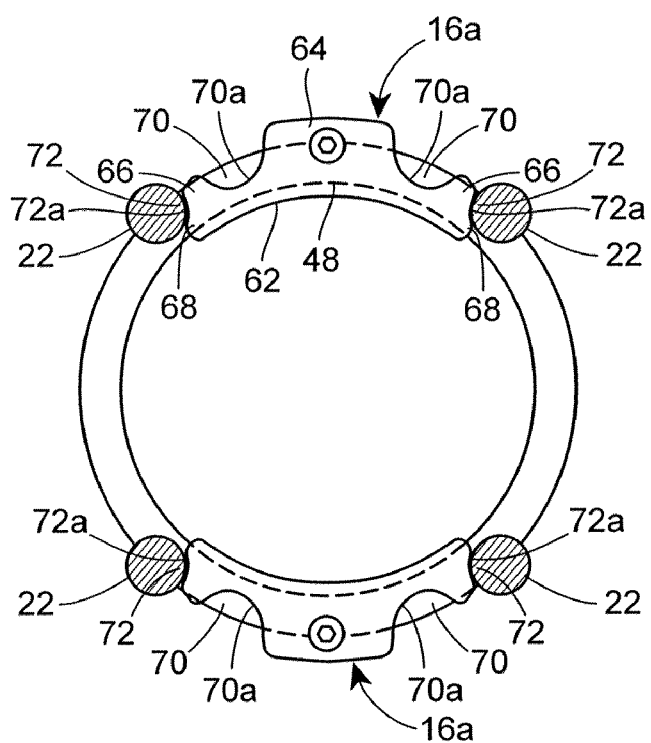
FIG. 5 is a schematic representation of an axial end view of the valve assembly including the first form of the centering component fitted to a second pattern of longitudinal bolts.

FIGS. 4 and 5 schematically represent an axial end view of the valve assembly 10 including a pair of centering components 16 constructed in accordance with one form of the present disclosure and positioned within a pipeline. The centering components 16 of FIGS. 4 and 5 include centering clips 16a. As shown, the centering clips 16a axially align the valve assembly 10 with the pipeline components 18 by engaging the bolts 22 that secure the pipeline components 18 together. Specifically, each centering clip 16a includes a generally flat steel plate having, as stated above in reference to FIG. 3, a radially inward portion 48 and a radially outward portion 50. The radially inward portion 48 includes an arc-shaped edge 62 having a radius slightly smaller than an outer radius of the seat retainer plate 28, as can be seen in FIGS. 1 and 3. The radially outward portion 50 includes a bull-nose portion 64, a pair of hip portions 66, and a pair of end portions 68. The radially outward portion 50 further includes a pair of first recesses 70 defined by first edges 70a on opposing sides of the bull-nose portion 64 and adjacent the hip portions 66. The first recesses 70 are generally semi-circular and adapted to receive bolts 22. When the first recesses receive bolts 22, each of the first edges 70a engage the bolts 22. Additionally, the radially outward portion 50 of the centering clip 16a includes a pair of second recesses 72 defined by second edges 72a in the end portions 68. Similar to the first recesses 70, the second recesses 72 are generally semi-circular and adapted to receive bolts 22. When the second recesses 72 receive bolts 72, each of the second edges 72a engage the bolts 22. In one form, the first and second recesses 70, 72 include diameters slightly larger than diameters of the bolts 22. In another form, the first recesses 70 include diameters different from the diameters of the second recesses 72. Additionally, it should be appreciated that while the recesses 70, 72 have been disclosed herein as being semi-circular, other forms of the centering component 16 may include polygonal recesses or any other shape suitable for receiving the bolts 22.

In accordance with this form of the centering component 16, FIG. 4 depicts the centering clip 16a accommodating bolts 22 disposed on a 2-inch diameter pipeline and spaced and arranged according to the American National Standards Institute (ANSI), pressure Class 300 bolt pattern. Specifically, each of the first edges 70a defining the first recesses 70 radially engage a bolt 22, while the second edges 72a defining the second recesses 72 do not. Alternatively, FIG. 5 depicts the centering clip 16a accommodating bolts 22 on a 2-inch diameter pipeline and spaced and arranged according to the American National Standards Institute (ANSI), pressure Class 150 bolt pattern. Specifically, each of the second edges 72a defining the second recesses 72 radially engage a bolt 22, while the first edges 70a defining the first recesses 70 do not. Therefore, it should be appreciated that the centering clip 16a depicted in FIGS. 4 and 5 includes a versatile centering component 16. Once the centering clip 16a is attached to the valve body 12, it may accommodate multiple classes or configurations of bolt patterns. It should further be appreciated that while FIGS. 3 and 4 depict the first recesses 70 as being substantially larger than the second recesses 72, an alternate form of the centering clip 16a includes first and second recesses 70, 72 substantially similar in size. In yet another form, the second recesses 72 are larger than the first recesses 70.

Figure 6:
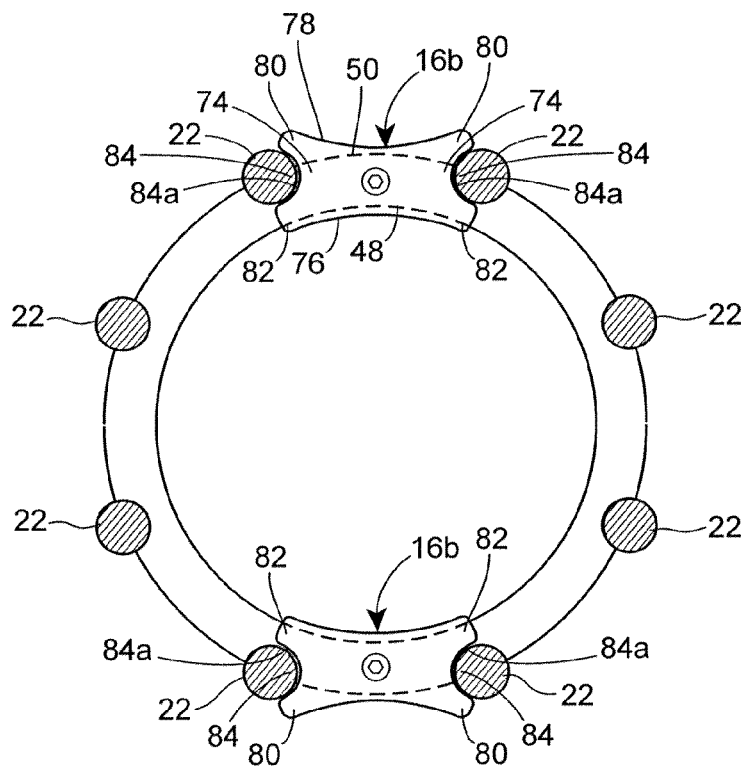
FIG. 6 is a schematic representation of an axial end view of a valve assembly including a second form of the centering component according to the principles of the present disclosure fitted to a third pattern of longitudinal bolts.
Figure 7:
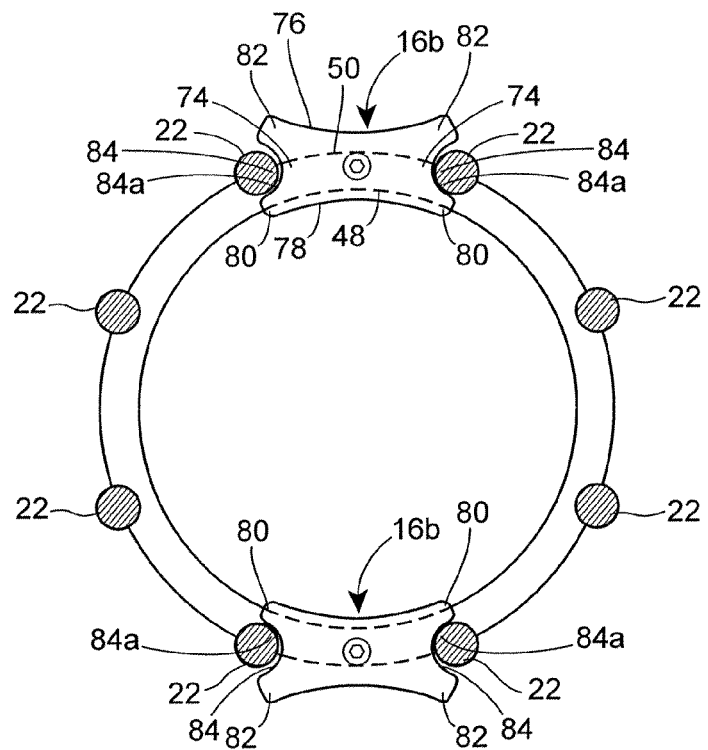
FIG. 7 is a schematic representation of an axial end view of the valve assembly including the second form of the centering component fitted to a fourth pattern of longitudinal bolts.

FIGS. 6 and 7 schematically represent an axial end view of the valve assembly 10 including a pair of centering components 16 constructed in accordance with an alternate form of the present disclosure and positioned within a pipeline. The centering components 16 of FIGS. 6 and 7 include centering clips 16b. As shown, the centering clips 16b axially align the valve assembly 10 with the pipeline components 18 by engaging the bolts 22 that secure the pipeline components 18 together. Specifically, each centering clip 16b includes a generally flat steel plate having, as stated above in reference to FIG. 3, a radially inward portion 48 and a radially outward portion 50. Additionally, the centering clips 16b include opposing end portions 74. As will be understood from the description provided below, however, this identification of radially inward and outward portions 48, 50 of the centering clip 16b depicted in FIGS. 6 and 7 is not descriptive because the clips 16b can be flipped, thereby positioning the radially outward portion 50 radially inside of the radially inward portion 48 relative to the centerline 21 of the pipeline components 18 depicted in FIG. 2 and vise versa.

Nevertheless, for the sake of the present description, the radially inward portion 48 includes an arc-shaped edge 76 and the radially outward portion 50 includes an arc-shaped edge 78. Both arc-shaped edges 76, 78 have a radius slightly smaller than an outer radius of the seat retainer plate 28, as can be seen in FIG. 3. The end portions 74 each include a minor finger 80 and a major finger 82 extending from the centering clip 16b and a recess 84 defined by an edge 84a between the minor and major fingers 80, 82. In the form depicted in FIGS. 6 and 7, the major fingers 82 have a width dimension or radial dimension that is greater than a width dimension of the minor fingers 78. The recesses 48 of the form disclosed are each generally semi-circular and adapted to receive bolts 22 to center the valve assembly 10 relative to the centerline 21 of the pipeline components 18 depicted in FIG. 2. In one form, the recesses 84 include diameters slightly larger than diameters of the bolts 22. Additionally, it should be appreciated that while the recesses 84 have been disclosed herein as being semi-circular, other forms of the centering clip 16b may include polygonal recesses or any other shape recesses suitable for receiving the bolts 22.

In accordance with this form of the centering component 16, FIG. 6 depicts the centering clip 16b accommodating bolts 22 disposed on a 4-inch diameter pipeline and spaced and arranged according to the American National Standards Institute (ANSI), pressure Class 300 bolt pattern. Specifically, the centering clip 16b is configured such that the major fingers 82 are disposed radially inward of the minor fingers 80. So configured, the edges 84a defining the recesses 84 radially engage bolts 22 patterned in accordance with ANSI class 300 for a 4-inch pipeline. Alternatively, FIG. 7 depicts the centering clip 16b accommodating bolts 22 disposed on a 4-inch diameter pipeline and spaced and arranged according to the American National Standards Institute (ANSI), pressure Class 150 bolt pattern. Specifically, the centering clip 16b is configured such that the minor fingers 80 are disposed radially inward of the major fingers 82. So configured, the edges 84a defining the recesses 84 radially engage bolts 22 patterned in accordance with ANSI class 150 for a 4-inch pipeline. Therefore, it should be appreciated that the centering clip 16b includes a versatile centering component 16 that can easily accommodate multiple bolt patterns.

In light of the foregoing, it should be appreciated that the present disclosure is not to be limited to the examples or forms presented herein, but rather, is intended to include variations thereon that are within the scope of the claims. For example, while the centering clips 16a, 16b have been disclosed herein as accommodating various classes of bolt patterns for 2-inch and 4-inch pipelines, specifically ANSI pressure classes 150 and 300, the present disclosure is not limited to these two configurations. Other classes of bolt patterns, as well as unclassified bolt patterns, are intended to be within the scope of the present application. Additionally, while the centering clips 16a, 16b have been disclosed herein as alternatively accommodating two different bolt patterns, alternate forms of the centering clips not expressly described herein may be configured to accommodate more than two bolt patterns. For example, the centering clip 16a described herein may alternately include a third, fourth, fifth, or any other number of pairs of recesses defined by edges for radially engaging bolts spaced and arranged according to yet further standard or non-standard patterns. Still further, the centering clip 16b described above may define more than one recess on its opposing end portions 74. The additional recess or recesses could be employed to accommodate bolts spaced and arranged according to further alternative bolt patterns. Further yet, it is foreseeable that a centering component 16 combining the aspects of the centering clip 16a with the aspects of the centering clip 16b could be employed to accommodate still further alternate bolt patterns. Still further, the centering component 16 may not include recesses at all, but rather, may merely be contoured having substantially no negative space or recesses such that its edge or edges are capable of engaging the bolts 22 and axially aligning the valve assembly 10.

In light of the foregoing, it should be appreciated that the subject matter of the present disclosure provides a versatile and functional centering component 16 easily adaptable to center a wafer-type valve assembly 10 relative to a centerline 21 of a pipeline configured in accordance with various flange ratings having various bolt patterns. Additionally, the subject matter of the present disclosure alleviates the temptation to lift the entire valve assembly 10 by the holes or apertures that are ubiquitous in known centering components. The presently disclosed centering components 16 are free from apertures that are available for such lifting and/or transporting and, therefore, ensure proper performance of the valve. Finally, it should be appreciated that the subject matter of the present disclosure facilitates installation of the valve assembly 10 into a pipeline because the bolts 22 do not need to be passed through holes in the centering clips 16a, 16b. Rather, the valve assembly 10 need only to be positioned adjacent the pipeline components 18 such that the recesses 70, 72, 84 in the centering clips 16a, 16b receive the bolts 22. As stated above, the edges 70a, 72a, 84a thereby radially engage the bolts 22 and, more particularly, the bottom set of bolts 22 to support the entire valve assembly 10 during installation or removal.

Finally, the description of the present disclosure should be understood as merely providing examples of the present invention and, thus, variations that do not depart from the gist of the invention are intended to be within the scope of the invention.

What is claimed is:

1. A wafer-style valve assembly adapted to be fixedly located relative to a centerline of a pipeline by a plurality of longitudinal fasteners, the valve assembly comprising:
    a substantially cylindrical valve body having a peripheral edge portion;
    a first centering clip disposed on the valve body and extending outward of the peripheral edge portion; and
    a second centering clip disposed on the valve body and extending outward of the peripheral edge portion,
    each of the first and second centering clips including a first arc-shaped edge bounded by a pair of first fingers and a second arc-shaped edge bounded by a pair of second fingers, each of the first and second centering clips further including a pair of recesses, each recess bounded by one of the first fingers and one of the second fingers;
    wherein the first and second centering clips comprise first and second plates removably securable to a common axial end surface of the valve body in a first configuration in which the first arc-shaped edge is disposed radially inward and a second and opposite configuration in which the second arc-shaped edge is disposed radially inward, such that the first and second plates are capable of accommodating a first pattern of longitudinal fasteners when disposed in the first configuration to locate the valve assembly relative to the centerline of the pipeline, and a second pattern of longitudinal fasteners when disposed in the second configuration to locate the valve assembly relative to the centerline of the pipeline, wherein the first pattern is distinct from the second pattern.

2. The valve assembly of claim 1, wherein each of the recesses includes a curved edge adapted to at least partially surround one of the longitudinal fasteners.

3. The valve assembly of claim 1, wherein the first fingers are wider than the second fingers.

4. The valve assembly of claim 1, further comprising a seat retaining plate disposed on the axial end surface of the valve body adjacent to the first and second centering clips, wherein the first and second centering clips secure the seat retaining plate to the valve body.

5. A wafer-style valve assembly adapted to be coupled between opposing pipeline components having a common centerline secured together by a plurality of longitudinal fasteners, the valve assembly comprising:
    a substantially cylindrical valve body having a peripheral edge portion and an axial end surface;
    a seat retaining plate disposed on the axial end surface;
    a flat first centering clip removably disposed on the axial end surface of the valve body and extending outward of the peripheral edge portion; and
    a flat second centering clip removably disposed on the axial end surface of the valve body and extending outward of the peripheral edge portion, the first and second centering clips cooperating to secure the seat retaining plate to the valve body;

each of the first and second centering clips having a radially inward portion securing the seat retaining plate to the valve body and a radially outward portion having a pair of first edges defining a pair of first recesses, each of the first recesses adapted to accommodate a first pair of longitudinal fasteners disposed in a first pattern to permit the first pair of fasteners to secure the pipeline components to one another; and each of the first and second centering clips further defining a pair of second recesses, each of the pair of the second recesses adapted to accommodate a second pair of longitudinal fasteners disposed in a second pattern different from the first pattern to permit the second pair of fasteners to secure the pipeline components to one another.

6. The valve assembly of claim 5, wherein each of the first recesses on each of the first and second centering clips is adapted to at least partially surround one of the longitudinal fasteners.

7. The valve assembly of claim 5, wherein each of the first and second centering clips is configurable between a first position relative to the valve body for accommodating a first pattern of longitudinal fasteners and a second position relative to the valve body for accommodating a second pattern of longitudinal fasteners that is different than the first pattern.

8. The valve assembly of claim 5, wherein each of the first and second centering clips includes a pair of opposing end portions including the pair of first edges defining the pair of first recesses.

9. The valve assembly of claim 5, wherein the radially outward portion of each of the first and second centering clips further defines a pair of second edges defining a pair of second recesses such that the first recesses are adapted to accommodate a first pattern of longitudinal fasteners and the second recesses are adapted to accommodate a second pattern of longitudinal fasteners that is different than the first pattern.

* * * * *

UNITED STATES PATENT AND TRADEMARK OFFICE
CERTIFICATE OF CORRECTION

| | | |
|---|---|---|
| PATENT NO. | : 7,703,745 B2 | Page 1 of 1 |
| APPLICATION NO. | : 11/380108 | |
| DATED | : April 27, 2010 | |
| INVENTOR(S) | : Paul R. Dalluge et al. | |

It is certified that error appears in the above-identified patent and that said Letters Patent is hereby corrected as shown below:

In the Specification:

At Column 6, line 43, "vise" should be -- vice --.

Signed and Sealed this
Twenty-sixth Day of April, 2011

David J. Kappos
*Director of the United States Patent and Trademark Office*